United States Patent [19]

Baker

[11] Patent Number: 4,877,693
[45] Date of Patent: Oct. 31, 1989

[54] FUEL CELL APPARATUS FOR INTERNAL REFORMING

[75] Inventor: Bernard S. Baker, Brookfield Center, Conn.

[73] Assignee: Energy Research Corporation, Danbury, Conn.

[21] Appl. No.: 129,928

[22] Filed: Dec. 2, 1987

Related U.S. Application Data

[63] Continuation of Ser. No. 37,808, Apr. 10, 1987, abandoned, which is a continuation of Ser. No. 812,315, Dec. 23, 1985, abandoned.

[51] Int. Cl.$^4$ .............................................. H01M 8/18
[52] U.S. Cl. ........................................ 429/19; 429/20; 429/34
[58] Field of Search ....................... 429/17, 19, 20, 34

[56] References Cited

U.S. PATENT DOCUMENTS 4,647,516  3/1987  Matsumura et al. ................. 429/19

FOREIGN PATENT DOCUMENTS 58-119166  7/1983  Japan ..................................... 429/17
58-119167  7/1983  Japan ..................................... 429/17

Primary Examiner—Stephen J. Kalafut
Attorney, Agent, or Firm—Robin, Blecker, Daley & Driscoll

[57] ABSTRACT

A fuel cell apparatus in which the anode gas chambers of the fuel cells of the apparatus are provided with a reforming catalyst and a catalyst chamber running in the direction of the anode chambers is also provided with reforming catalyst and is in heat conducting relationship with the fuel cell apparatus, the gas exit port of the catalyst chamber being aligned with and coupled to the gas entry ports of the anode chambers.

10 Claims, 2 Drawing Sheets

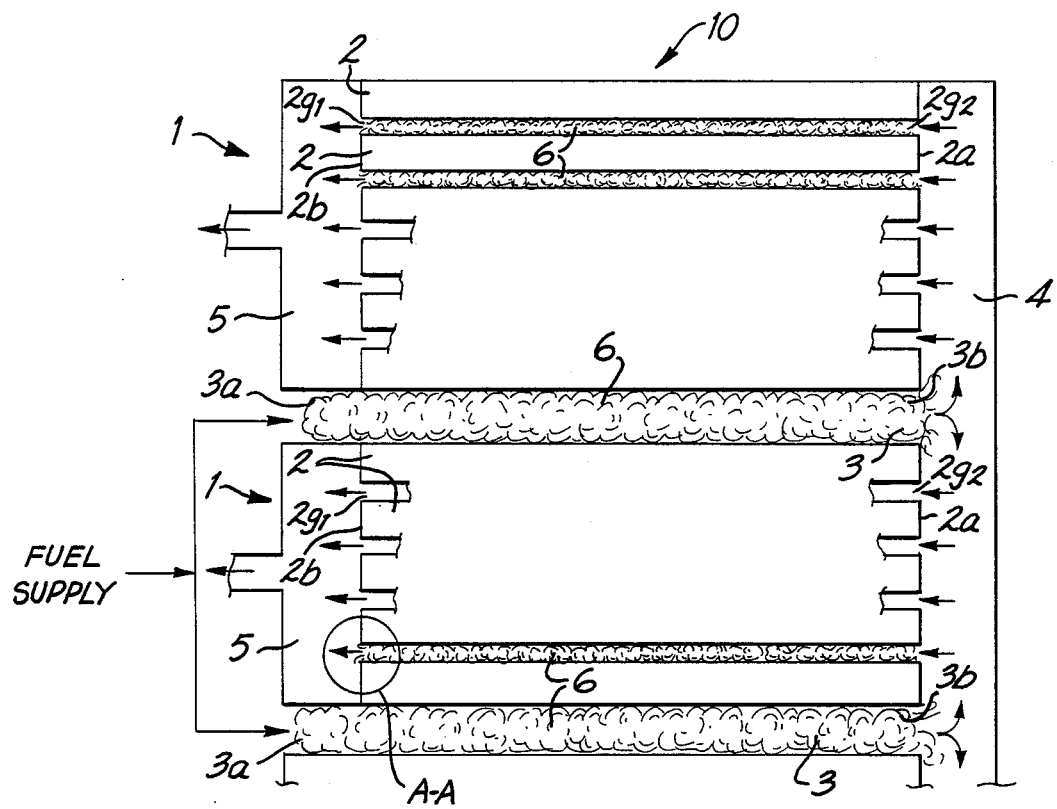
FIG. 1
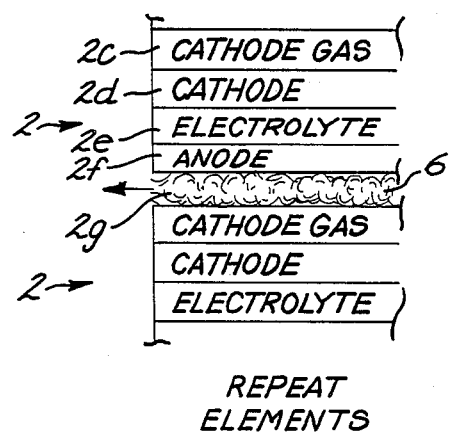
REPEAT ELEMENTS
FIG. 2 (A-A)

FUEL CELL APPARATUS FOR INTERNAL REFORMING

This application is a continuation of application of Ser. No. 037,080 filed Apr. 10, 1987, which is a continuation of Ser. No. 812,315 filed Dec. 23, 1985, both now abandoned.

BACKGROUND OF THE INVENTION

This invention relates to fuel cells and, in particular, to fuel cells in which the fuel process gas for the fuel cells is derived by reforming of the fuel supply internal of the fuel cells.

A variety of fuel cell arrangements have been proposed in which the fuel process gas for the cells is internally generated. In U.S. Pat. No. 3,488,226 internal reforming is carried out by situating the reforming catalyst directly in the anode chamber of the fuel cells. U.S. Pat. No. 4,182,795, on the other hand, utilizes a fuel cell chamber for the reforming catalyst which is isolated from the cell electrolyte.

The above fuel cell arrangements utilizing internal reforming are attractive because they eliminate the need for an external fuel processor and because they provide increased system efficiency. Also, there is a good match between the heat flows as the fuel cell electrochemical reaction is exothermic while the in situ fuel reforming reaction is exothermic.

The presence of the reforming catalyst in the fuel cell, however, tends to make the temperature distribution or profile of the cell in the direction of the fuel gas flow non-uniform, since the reforming reaction cools the cell to a greater degree in the regions thereof adjacent the point of introduction of the fuel supply. U.S. Pat. application No. 642,375, assigned to the same assignee hereof, discloses one technique for counteracting this effect by non-uniformly distributing reforming catalyst over the reforming chamber. Researchers, however, are still looking for less complex and simpler arrangements for negating the non-uniform cooling effect of the reforming catalyst.

It is therefore an object of the present invention to provide a fuel cell apparatus which utilizes internal reforming but which tends to avoid the non-uniformity in temperature profile which normally accompanies the reforming reaction.

SUMMARY OF THE INVENTION

In accordance with the principles of the present invention, the above and other objectives are realized in a fuel cell apparatus wherein one or more fuel cells each having first and second end faces are arranged in stack fashion and with their respective first end faces aligned and their respective second end faces aligned. Each fuel cell includes an anode chamber which runs between and which has gas entry and gas exit ports adjacent to its first and second end faces, respectively. A catalyst chamber is provided in heat conducting relationship to the stack of cells. The catalyst chamber runs in the direction of the anode chambers of the cells and has gas entry and gas exit ports adjacent to the second and first end faces of the cells, respectively. Catalyst promotive of endothermic reformation of a fuel supply is disposed in the catalyst chamber and in the anode chambers of the cells and means is provided for coupling the gas entry ports of the anode chambers of the cells to the gas exit port of the catalyst chamber.

With this structure for the fuel cell apparatus of the invention, fuel supply provided at the entry port of the catalyst chamber will tend to be reformed in regions of the chamber closest such end and thus closest the second end faces of the cells, while fuel supply not reformed in the catalyst chamber and coupled from its exit port to the entry ports of the anode chambers of the cells will tend to be reformed in regions of the anode chambers closest such entry ends and thus the first end faces of the fuel cells. The reforming which takes place in the catalyst chamber will therefore tend to cool the fuel cells in regions closer to the second end faces of the cells and the reforming which takes place in the anode chambers will tend to cool the fuel cells in regions closer to the first end faces of the cells. Accordingly, the overall effect will be a more uniform cooling of the cells than would otherwise take place if the reforming were carried out exclusively in the catalyst chamber or the anode chamber.

In the embodiment of the invention to be disclosed hereinafter, a plurality of fuel cell apparatuses are themselves arranged in a stack with a common manifold which couples the exit ports of the catalyst chambers of the apparatuses with the entry ports of the anode chambers of the fuel cells of the apparatuses. In a further embodiment of the invention, the catalyst in each catalyst chamber extends to a point short of the first end faces of the fuel cells and the catalyst in the anode chambers of the fuel cells extends to point short of the second end faces of the cells. This partial filling of the respective chambers tends to further promote uniformity in the cooling effect.

BRIEF DESCRIPTION OF THE DRAWINGS

The above and other features and aspects of the present invention will become more apparent upon reading the following detailed description in conjunction with the accompanying drawings, in which:

FIG. 1 shows schematically a plurality of fuel cell apparatuses arranged in a stack in accordance with the principles of the present invention;

FIG. 2 illustrates in greater detail the individual fuel cells comprising the fuel cell apparatuses of FIG. 1.

DETAILED DESCRIPTION

Figure 3:
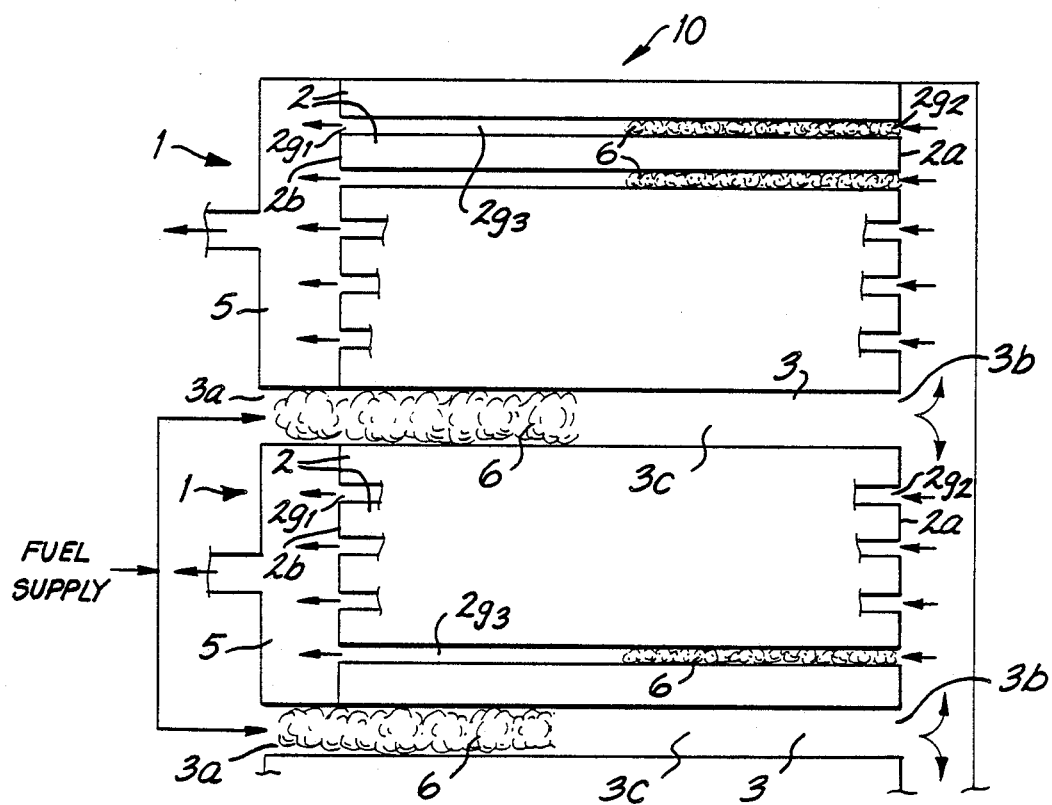
FIG. 3 shows a further embodiment of the fuel cell arrangement of FIG. 1.

FIG. 1 shows a plurality of fuel cell apparatuses 1 in accordance with the principles of the present invention. The fuel cell apparatuses 1 are themselves stacked together to form a composite fuel cell stack 10.

As shown, each fuel cell apparatus 1 includes one or more fuel cells 2 each having first and second end faces 2a and 2b. The fuel cells are stacked one on the other so that the end faces 2a of the cells and the end faces 2b of the cells are in adjacent aligned relationship.

As illustrated in greater detail in FIG. 2, each cell 2 comprises a sandwich construction of a cathode gas chamber 2c, a cathode electrode 2d, an electrolyte 2e, an anode electrode 2f, and an anode gas chamber 2g. The anode gas chamber 2g of each cell 2 runs between the end faces 2a and 2b of the cell and has a gas entry port 2g1 adjacent the end face 2a and a gas exit port 2g2 adjacent the end face 2b. Typically, the anode and cathode gas chambers 2c and 2g of the cells are formed by fuel cell plates having channels cut therein for gas passage.

Each fuel cell apparatus 1 further includes a catalyst chamber 3 situated in heat conducting relationship with the cells 2 of the apparatus. Each catalyst chamber 3 runs in the direction of the anode chambers of the cells 2 of the apparatus 1 and has gas entry and exit ports 3a and 3b adjacent the end faces 2b and 2a of the cells 2 and, thus, the gas exit 2g2 and gas entry ports 2g1 of the anode chambers 2g. In the present illustrative case, each catalyst chamber is formed by the facing cells of adjacent or following apparatuses 1.

The exit port 3b of each catalyst chamber 3 is, in turn, coupled to the entry ports 2g1 of the anode chambers 2g of the cells 2 of the associated apparatus 1. In the present case, this is accomplished by a manifold 4 which is common to all the catalyst chambers 3 and all the anode chambers 2g of the apparatuses 1.

Each of the apparatuses 1 is further provided with a manifold 5 which is common to the exit ports 2g2 of the anode chambers 2g of the cells 2 of that apparatus. Successive manifolds 5, in turn, define the entry ports 3a of the catalyst chambers 3.

In further accord with the invention, a catalyst 6 promotive of endothermic reforming of the hydrocarbon content of a fuel supply is disposed in each of the catalyst chambers 3 and in one or more of the anode chambers 2g of the cells 2 of the apparatuses 1. In the case shown in FIG. 1, catalyst is included throughout the length of each anode chamber 2g as well as each catalyst chamber 3.

With the apparatus of FIG. 1, fuel supply such as, for example, methane and water, is introduced into the entry ends 3a of the catalyst chambers 3, and is reformed in accordance with the well known reaction:

$$CH_4 + 2H_2O \rightarrow CO_2 + 4H_2 \qquad (I)$$

Since this reaction is endothermic, heat will be absorbed from each of the chambers 3, thereby cooling the chambers and the adjacent cells. This cooling, however, will be greater at the entry end 3a of the chamber 3 and, therefore, at the regions of the cells 2 closest the faces 2b, and will decrease in moving in the direction of gas flow to the exit end 3b and, therefore, to the regions of the cells 2 adjacent the end faces 2a. Cooling occurs in this manner because the concentration of fuel supply is greatest at the entry ends 3a and decreases in moving to the exit ends 3b of the catalyst chambers 3.

The partially reformed fuel supply after exiting from the catalyst chambers 3 is then coupled by the manifold 4 to the anode chambers 2g of the adjacent cells 2 of the apparatuses 1. In the chambers 2g, additional reforming in accordance with the reaction I as well as electrochemical conversion in accordance with the reaction II below takes place:

$$CO_3^= + H_2 \rightarrow H_2O + CO_2 + 2e \qquad (II)$$

The water produced by the reaction II as well as the withdrawal of hydrogen drives the reaction I in the anode chambers 2g to completion. In this case, the reforming reaction and, therefore, the cooling will be greater at the gas entry ends 2g1 and, therefore, in the regions of the cells 2 adjacent the end faces 2a and will decrease in the direction of gas flow to the gas exit end 2g2, and therefore, in the regions of the cells 2 adjacent the end faces 2b.

As can be appreciated, therefore, the reforming reaction for the gas flow through the catalyst chambers 3 tends to cool the cells 2 in the regions adjacent the end faces 2a to a greater extent than in the regions of the cells 2 adjacent the end faces 2b. The reforming reaction of the gas flow through the anode chambers 2g, on the other hand, which flow is countercurrent to the flow in the catalyst chambers, cools the cells 2 in the opposite manner, i.e., the regions of the cells adjacent the end face 2b are cooled to a greater extent that the regions adjacent the end face 2a. The overall effect is thus a more uniform cooling of the cells 2 than could otherwise be achieved by exclusively utilizing either the catalyst chambers 3 or the anode chambers 2g for the reforming reaction. The temperature distribution or profile of the cells 2 along the path of the gases is thus maintained more uniform.

As can be further appreciated, a more refined control over the temperature distribution can be realized by restricting the location of the catalyst in the chambers 2g and 3. FIG. 3 illustrates one such embodiment wherein catalyst extends from the entry and 3a to a point short of the exit end 3b of the chambers 3. The chambers 3 are thus devoid of catalyst over a region 3c adjacent the fuel cell ends 2a of the cells 2. Similarly, the catalyst in the anode chambers 2g is short of the exit ends 2g2 to define non-catalyst regions 2g3.

It is contemplated under the invention that in designing a stack as shown in FIGS. 1 and 3 that there be one catalyst chamber 3 for every 5 to 10 fuel cells 2. It is also preferable that the volume of the catalyst chamber be less than the cumulative volume of the anode chambers 2 which it feeds. The actual values of the numbers of cells, relative volumes and relative filling of the chambers with catalyst for optimum uniformity can be empirically determined for any particular case.

It should be noted that in the case of the FIG. 1 arrangement, i.e., with catalyst throughout the entire lengths of the chambers 2g and 3, it is expected that most of the reaction I in the chambers 3 will take place in the first half of the chambers measured from the entry ports 3a. Likewise, the reaction in the anode chambers 2g would be expected to occur in the first one-third of the chambers measured from the entry ports 2g1.

As can be further appreciated from the above and as shown, each of the anode gas chambers 2g and the catalyst 6 in each of these chambers are in gas communication over their respective lengths with the adjacent anode electrode 2f. The chambers 3 and the catalyst 6 therein, in turn, as shown, are in gas communication with the cells 2 only through coupling of their exit ends 3b with the entry ends 2g2 of the anode chambers 2g.

In all cases, it is understood that the above-described arrangements are merely illustrative of the many possible specific embodiments which represent applications of the present invention. Numerous and varied other arrangements can readily be devised without departing from the spirit and scope of the invention.

What is claimed is:

1. Apparatus comprising:
   a number of one or more first fuel cells arranged in a first stack, the first cells having respective first end faces which are aligned and respective second end faces which are aligned, each first cell including a sandwich construction of an anode chamber, an anode electrode, an electrolyte, a cathode electrode and a cathode chamber, each anode chamber extending between the first and second end faces of its respective first cell and having a gas entry port adjacent the first end face and a gas exit port adjacent the second end face;

a catalyst chamber in heat conducting relationship with the first stack and running in the direction of the anode chambers of said first cells, said catalyst chamber having a gas entry port adjacent the second end faces of said first cells and a gas exit port adjacent the first end faces of said first cells;

a catalyst for endothermic reforming of the hydrocarbon content of a fuel disposed in one of more of said anode chambers and said catalyst chamber, the catalyst in said catalyst chamber being disposed from the gas entry port of said catalyst chamber to a point short of the gas exit port of said catalyst chamber and the catalyst in said one or more anode chambers being partially disposed in each of its respective anode chambers from the gas entry port of the chamber to a point short of the gas exit port;

and first means for coupling the gas exit port of said catalyst chamber to the gas entry ports of the anode chambers of said first cells.

2. Apparatus in accordance with claim 1 further comprising:

second means for supplying fuel having hydrocarbon content to said gas entry port of said catalyst chamber.

3. Apparatus in accordance with claim 1 wherein:
said first stack includes from five to ten first fuel cells.

4. Apparatus in accordance with claim 1 wherein:
said first means comprises a first manifold common to the gas exit ports of said catalyst chamber and the gas entry ports of said anode chambers of said one or more cells.

5. Apparatus in accordance with claim 1 further comprising:

a number of one or more second fuel cells arranged in a second stack, the second cells having respective first end faces which are aligned with each other and with the first end faces of the first fuel cells and respective second end faces which are aligned with each other and the respective second end faces of the first fuel said, each second cell including a sandwich construction of an anode chamber, an anode electrode, an electrolyte, a cathode electrode and a cathode chamber, each anode chamber extending between the first and second end faces of its respective second cell and having a gas entry port adjacent the first end face and a gas exit port adjacent the second end face;

said second stack being arranged in stacked spaced relationship with said first stack so that said space between said stacks forms said catalyst chamber which is in heating conducting relationship with both said stacks;

said catalyst being disposed in the anode chambers of one or more of said second cells;

and said first means further coupling the gas exit port of said catalyst chamber to the gas entry ports of the anode chambers of said second cells.

6. Apparatus in accordance with claim 5 wherein:
said apparatus further comprises a further catalyst chamber in heating conducting relationship with and following said second stack, said further catalyst chamber running in the direction of the anode chambers of said second cells and having a gas entry port adjacent the second end faces of said second cells and a gas exit port adjacent the first end faces of said second cells;

said catalyst being disposed in said further catalyst chamber;

and said first means further coupling the gas exit port of said further catalyst chamber to the gas entry ports of the anode chambers of said second fuel cells.

7. Apparatus in accordance with claim 6 wherein:
said first means comprises a first manifold common to the gas exit ports of said catalyst chambers and the gas entry ports of the anode chambers of said one or more first fuel cells and said one or more second, fuel cells.

8. Apparatus in accordance with claim 7 further comprising:

a second manifold common to the gas exit ports of the anode chambers of said first cells;

and a third manifold common to the gas exit ports of the anode chambers of said second cells.

9. Apparatus in accordance with claim 4 wherein:
each of said anode chambers and the catalyst in each of said chambers are in gas communication over their respective lengths with the adjacent anode.

10. Apparatus in accordance with claim 9 wherein:
said catalyst chamber and the catalyst therein are in gas communication with said first cells only through said coupling of the gas exit port of said catalyst chamber and the gas entry ports of the anode chambers of said first cells.

* * * * *

UNITED STATES PATENT AND TRADEMARK OFFICE
CERTIFICATE OF CORRECTION

PATENT NO. : 4,877,693
DATED : October 31, 1989
INVENTOR(S) : Bernard S. Baker

It is certified that error appears in the above-identified patent and that said Letters Patent is hereby corrected as shown below:

Col. 4, line 7, change "that" to -- than --

Col. 4, line 19, change "and" to -- end --

Col. 5, line 45.
    Claim 5, line 9. Change "said" to -- cells --

Col. 6, line 32.
    Claim 7, line 5. Delete ","

Col. 6, line 40.
    Claim 9, line 1. Change "4" to -- 1 --

Signed and Sealed this

Twenty-seventh Day of August, 1991

Attest:

HARRY F. MANBECK, JR.

Attesting Officer      Commissioner of Patents and Trademarks